US005547357A

United States Patent [19]

Bergendahl

[11] Patent Number: 5,547,357

[45] Date of Patent: Aug. 20, 1996

[54] APPARATUS FOR HOT-BRIQUETTING IRON SPONGE

[75] Inventor: Hans-Georg Bergendahl, Bochum, Germany

[73] Assignee: Maschinenfabrik Koppern GmbH & Co. KG, Hattinger, Germany

[21] Appl. No.: 246,884

[22] Filed: May 20, 1994

[30] Foreign Application Priority Data

Dec. 8, 1993 [DE] Germany ............................ 9318843 U

[51] Int. Cl.[6] ............................... B29C 31/00; B22F 3/03

[52] U.S. Cl. ........................... 425/79; 249/111; 264/40.4; 425/141; 425/145; 425/147; 425/367; 425/579; 425/580; 425/447; 425/449

[58] Field of Search ................................. 264/40.1, 40.4, 264/40.5; 425/363, 367, 145, 147, 579, 585, 447, 449, 78, 79, 580, 585, 141, 143; 249/106, 111; 164/429, 432

[56] References Cited

U.S. PATENT DOCUMENTS

| | | | |
|---|---|---|---|
| 1,804,207 | 5/1931 | Charman et al. | 249/111 |
| 3,620,157 | 11/1971 | Rieschel | 425/363 |
| 3,752,435 | 8/1973 | Daussan | 249/106 |
| 3,794,287 | 2/1974 | Atkinson | 249/106 |
| 3,901,635 | 8/1975 | Greenberger | 425/367 |
| 3,988,095 | 10/1976 | Mersch et al. | 425/363 |
| 4,144,009 | 3/1979 | Jackson et al. | 425/367 |
| 4,721,278 | 1/1988 | Vallak et al. | 249/106 |

*Primary Examiner*—Khanh P. Nguyen
*Attorney, Agent, or Firm*—Skjerven, Morrill, MacPherson, Franklin and Friel; Thomas S. MacDonald

[57] ABSTRACT

An apparatus for hot-briquetting iron sponge includes a gravity feeder which has a feed shaft and a regulating tongue which supplies material in a dosed quantity to a moulding gap of a roller press, in such a way that the apparatus can also be used for pressing hot iron sponge at temperatures of up to 1000° C. for obtaining high-density briquettes of good quality. The regulating tongue is provided with a heat-reducing insulating layer and cooling system. The feed shaft and a feed hopper also may have a heat-insulation layer and a cooling system. A flow-rate control is provided for gravity feeders where bulk material or flowable material is supplied by at least one regulator through a feed shaft to a moulding gap formed between at least two rolls and is processed by the rolls. At least one of the rolls is motor-driven. The material is supplied to the moulding gap by the regulating tongue in response to a driven roll torque sensed by a torque detector. A displacement path detector may also be employed to sense lateral displacement of the rolls.

36 Claims, 5 Drawing Sheets

APPARATUS FOR HOT-BRIQUETTING IRON SPONGE

BACKGROUND OF THE INVENTION

1. Field of the Invention

The present invention refers to an apparatus for hot-briquetting iron sponge, comprising a gravity feeder which comprises a feed shaft and regulating means and which supplies material in dosed quantity to the moulding gap of a roller press.

2. Background

For the purpose of hot-briquetting iron sponge and flue dusts, material feeders provided with a feed shaft are normally used, said feed shaft being directed towards the moulding gap of a roller press and having arranged therein a preforming screw. The preforming screw serves as a means for conveying the material and it guarantees that the flow of material to the roller press can be controlled as desired. In addition, pressure is applied to the material in the inlet area of the roller press by means of the preforming screw. The material is conveyed to the moulding gap of the roller press by means of the preforming screw and urged, in a precompacted condition, into briquetting moulds of the roller press. This is necessary for obtaining a briquette density of more than 5 g per cubic centimetre.

It is disadvantageous that a hot-briquetting apparatus provided with a screw-type material feeder can only be used for maximum operating temperatures of from 700° to 750° C. New iron ore reduction processes, however, necessitate temperatures of up to 1000° C. in the briquetting press for further processing the material. This type of material feeder, and especially the preforming screw, are not capable of resisting these temperatures. The material of the screw becomes soft and deforms due to the substantial temperature and pressure loads. Attempts which have been made for cooling the screw proved to be very complicated and expensive from the structural point of view. Moreover, a cooled screw will cool down the material in the area close to the screw to such an extent that it is no longer suitable for the hot-briquetting process.

In connection with a subject matter which belongs to the above-mentioned class of device and which is known from the cold-briquetting process, a gravity feeder is known which converts undersize material with a grain size of up to three millimetres, which can no longer be supplied to an electric furnace directly, into briquettes by pressing. This type of apparatus can, in an disadvantageous manner, only be used for cold-pressing grain sizes up to 3 mm. Coarser materials, occurring e.g. in the form of lump ore and pellets having a size of up to 25 mm in hot-briquetting plants, can thus no longer be processed such that above-mentioned briquetting density is obtained.

SUMMARY OF THE INVENTION

The present invention is based on the technical problem of providing an apparatus of the above-mentioned class of device by means of which hot iron sponge can be converted into high-density briquettes of good quality by pressing at temperatures of up to 1000° C.

In accordance with the present invention, this technical problem is solved by providing the regulating means with heat-reducing means.

The heat-reducing means reduce the heat load acting on the regulating means. The heat-reducing means are capable of reducing the supply of heat by heat-insulating materials and they are also capable of increasing the dissipation of heat, e.g. due to the fact that a cooling device is provided. The regulating means can selectively be provided either with heat-insulating materials or with a cooling device. An optimum effect is produced by the use of heat-insulating and heat-dissipating means. The materials which can be used as heat-insulating means are, for example, ceramics or other mechanically-resistant and heat-resistant materials. Surprisingly enough, a gravity feeder according to the present invention can be used for hot-briquetting material with grain sizes of approx. 25 mm. It is thus possible to achieve densities exceeding 5 g/cm$^3$ without using any device for precompacting the material.

Just as surprising is the fact that the material in the area of a cooled regulating means is still suitable for hot-briquetting. In addition to the practical use of the invention in connection with iron sponge, the solution according to the present invention is also adapted to be applied to processes in the case of which similar hot bulk materials are obtained. Hot-briquetting by means of the apparatus according to the present invention can, for example, also be used for phosphate, burnt refractories or ceramics.

The regulating means are preferably provided with cooling means. The cooling means dissipate the heat absorbed by the regulating means and reduce the heat level of the regulating means during operation. Means which are imaginable as cooling means are, for example, cooling channels and cooling coils within the regulating means or on the surface thereof.

It will be advantageous when the regulating means are water-cooled. Cooling by water is particularly suitable for dissipating heat.

The regulating means are lined with a refractory in an advantageous-manner. The regulating means and the heat-insulating means are thus protected against destruction by fire.

The feed shaft can be provided with heat-reducing means in a special way. Heat-insulating means as well as heat-dissipating means can be used as heat-reducing means. The optimum temperature protection consists of a combination of these two means. The feed shaft is thus also protected against damage caused by excessive heating. The feed shaft, which may be provided with feed hoppers projecting into the moulding gap in the area close to the rolls, is in this way also protected in the area around the roller press which is subjected to mechanical and thermal loads. Moreover, the heat-insulating means will protect against wear before the supporting parts of the feed shaft are attacked.

It is suggested that the inner side of the feed shaft should be lined with a refractory. This will protect the heat-insulating material and the feed shaft, respectively, against damage caused by fire.

The feed shaft can be provided with cooling means in a special manner. The cooling means dissipate the heat of the feed shaft so that the feed shaft can be subjected to an increased amount of heat. With the aid of cooling means, the operating temperature of the feed shaft can be maintained at a desired level. The cooling means used may, for example, be cooling hoses.

The feed shaft is preferably water-cooled. As has already been mentioned hereinbefore, water proved to be a particularly advantageous coolant in connection with a cooling system used in hot-briquetting processes for iron sponge.

The apparatus comprises a moulding gap, which is formed between at least two rolls, and at least one driven roll. A variant according to the present invention is that at least the driven roll is provided with a torque detector, which is connected to an actuator of the regulating means via a central unit.

The torque prevailing at the roll can be measured via the torque detector and supplied to the central unit in the form of a signal. The central unit processes this signal and transmits a command to the actuator of the regulating means, which will then vary the supply of material accordingly. The central unit can serve as a control unit and as a closed-loop control unit, or it may serve as a combination of both.

This is particularly suitable for a supply of hot bulk material, which, having the special flow characteristics resulting from high temperatures, can be supplied to the moulding gap in precisely dosed quantities.

A sufficient supply of material through the feed shaft to the moulding gap is thus always guaranteed. The filling level in the moulding gap can be controlled precisely so that, in cases in which precompacting of the material is required, a sufficiently high column of material will always be available, which applies a sufficiently high hydrostatic pressure to the material located close to the moulding gap.

In accordance with a preferred embodiment of the present invention, the feed shaft is provided with a filling level detector which is connected to the central unit. The filling level in the feed shaft can be measured with the aid of the filling level detector and, via the central unit, it can be incorporated into the control or the closed-loop control of the regulating means. The precompacting and, consequently, the density and the quality of the briquettes can thus be varied precisely.

Preferably, at least one of the rolls is connected to a roll pressure detector which is connected to the central unit. The roll pressure can be measured in this way and it can be incorporated into the control commands of the central unit as an additional criterion for advantageous process conditions.

It will be expedient when at least one of the rolls is supported such that it is laterally displaceable relative to its axis of rotation. The width of the moulding gap is thus variable and the roll can swerve to the side depending on the amount of material supplied. Briquettes of varying thickness can be produced.

In accordance with one variant of the present invention, the displaceably supported roll is provided with a displacement path detector connected to the central unit. The control command transmitted to the regulating means can be influenced via the signal detected at the displacement path. The desired product can be adjusted precisely via this influencing quantity.

It is also imaginable that the regulating means is provided with a horizontal conveyor directed towards the feed shaft. The horizontal conveyor is adapted to be used for supplying material, originating e.g. from a preceding process, to the feed shaft in a continuous mode of supply. The flow of material can be varied by controlling the speed of the horizontal conveyor.

In accordance with a preferred embodiment, the feed shaft is arranged asymmetrically with respect to the moulding gap. An increased amount of the material supplied to the roller press is thus fed to one roll. This roll can fulfill transport tasks for producing an adequate preforming force for the purpose of precompacting and for filling the roller moulds. The amount of material per unit time supplied to the roller press can be determined by the roll acting as a conveying roll. Independently of different material flow rates distributed over the cross-section, the constant flow of material determined by said one roll acting as a conveying roll is supplied to the moulding gap. This results in briquettes having a uniform size as well as a high and uniform density.

In accordance with one variant of the present invention, the regulating means completely close the feed shaft when they are in a closing position. It is thus possible to interrupt the flow of material in the filled condition of the feed shaft. This will be particularly advantageous for the purpose of eliminating material which clogs the feed shaft by stopping the flow of material and by causing the roller press to rotate until it is empty.

It will be expedient when the regulating means completely uncover the feed shaft in an opening position. It is thus possible to achieve a maximum flow of material through the feed shaft.

The regulating means are arranged in an advantageous manner in the area of the end of the feed shaft which faces the rolls. The cross-section of the flow of material can thus be reduced in the direction of the roller press by the regulating means located downstream. Precompacting of the material is achieved before the material reaches the moulding gap.

The regulating means may be directed towards the moulding gap in a funnel like manner when they are in the opening position. This is particularly advantageous with regard to the continuous flow of material towards the moulding gap. The funnel shaped configuration has the effect that the material will be precompacted.

It is imaginable that the regulating means are connected to a motor operator. Via this motor operator, the regulating means can be moved to the desired opening or closing position. The adjustment process can be controlled remote from the hot area of the material feeder.

In accordance with one variant of the present invention, the feed shaft is provided with lateral feed hoppers extending into the moulding gap. The feed hoppers define an extension of the feed shaft. The material to be pressed is thus supplied right to the moulding gap of the feed shaft. All of the material to be pressed is fed into the moulding gap; the losses of material are minimal. The feed hoppers may be arranged such that they reduce the cross-section in comparison with the rest of the feed shaft so that the material to be pressed will be subjected to additional precompacting by the feed hoppers in the lower area of the feed shaft. It is thus possible to achieve a higher final density of the briquettes.

Preferably, the feed hoppers are essentially adapted to the circular shape of the circumferential surfaces of the rolls. This has the effect that losses of material or of the pressure used for the pressing process are minimized. The feed hopper can be formed such that it extends down to the narrowest point of the moulding gap close to the circumferential surfaces of the rolls.

It will be particularly advantageous when the feed shaft is constructed as a storage hopper. The roller press can thus be operated continuously, but the plant can be charged intermittently. The storage hopper can partly be filled with material so as to provide a space for the degasification of the material above the filling. The storage hopper may be used as a container for rendering the material inert with inert gas. The material filled in calms down in the storage hopper and slides slowly downwards therein. The material contained in the storage hopper applies hydrostatic pressure to the material located further down, especially to the material located at the entrance of the roller press, so that this material will be precompacted before it reaches the roller press. It is thus possible to achieve a better filling of the roller moulds as well as a higher density of the briquettes. The filling level of the storage hopper can be used for controlling the briquette density. In accordance with this criterion, it is, for example, possible to control a continuously operating conveyor means for filling the storage hopper.

In accordance with one variant of the present invention, the feed shaft is provided with connection pieces in the upper area thereof. The connection pieces may be used for supplying e.g. revert material (recycle) or inert gas. Furthermore, the gas escaping from the material can be sucked off through a connection piece.

It will be advantageous when the feed shaft is adapted to be closed completely by a closure element which is movable relative thereto. This will have the effect that the regulating means will not be subjected to the closing forces when the feed shaft is being closed. The structural design of the regulating means can be optimized with respect to the regulating task to be fulfilled. The closure means, however, is constructed such that it is adapted to resist mechanical and thermal loads so that it will counteract the forces applied by the material which remains in the feed shaft.

The closure element is constructed as a slide in a special manner and is adapted to be moved into the feed shaft with a translatory movement. A slide is easy to produce, and it can be manufactured at a moderate price together with the adequate slide guide means. A slide is a space-saving device and it can be arranged at an arbitrary location of the feed shaft. It is adapted to be moved into and drawn out of the feed shaft with a translatory movement and this can be done by hand or with the aid of a drive means. The slide can be removed from the feed shaft to such an extent that the cross-section of the feed shaft is uncovered completely.

In accordance with a preferred embodiment, the regulating means are constructed as at least one regulating tongue. Along the tongue shape of the regulating tongue, material can be supplied to the roller press such that it is directed towards the moulding gap. The tongue may be directed in a funnel-shaped manner towards the roller press such that a precompacting effect is produced.

In accordance with an expedient embodiment, the regulating tongue can be adapted to be rotated about a shaft. The regulating tongue can thus be pivoted into the feed shaft and change the cross-section thereof. The pivotal movement is suitable for pivotally moving the tongue into the feed shaft even during the flow of material. The flow of material can thus be controlled continuously.

Preferably, the regulating tongue extends, at least in the open condition, at least partially into the moulding gap. This has the effect the narrowest cross-section is defined between one of the rolls and the regulating tongue. The roll transports the material towards the regulating tongue in the direction of rotation of the roll and subjects the material thus to a preforming force already during the material feed process. Moreover, this arrangement guarantees a uniform supply of material through the narrowest cross-section between the regulating tongue and the feed shaft independently of different flow-rate distributions of the material occurring in the cross-section of the feed shaft. The gap between the regulating tongue and the roll is adapted to be adjusted depending on the quantity of the material fed, on the flow rate of the material and on its grain size. It is thus possible to optimize the briquette denisty and their quality.

It will be particularly advantageous when the maximum distance X which can be adjusted between the end of the regulating tongue extending into the moulding gap and the opposite roll is approximately twice to three times as large as the smallest width of the moulding gap. This dimensional relationship is particularly advantageous for a continuous supply of material from the feed shaft past the regulating tongue and towards the moulding gap. Briquettes of high density and superior quality are thus produced in a trouble-free mode of operation and at a very high production speed of the machine.

In accordance with a variant of the present invention, the regulating means are constructed as at least one sidewall member of the feed shaft, said sidewall member being adapted to carry out a relative movement.

It will be particularly advantageous when a sidewall member of the feed shaft is lined with a heat-insulating material or provided with cooling means. The sidewall member is adapted to be moved into and out of the feed shaft in such a way that the cross-section of the feed shaft is varied. The amount of material supplied is influenced by the size of the cross-section adjusted and by the frictional forces occurring between the material and the sidewalls of the feed shaft. Depending on the size of the cross-section, a force will occur which results from the weight and the hydrostatic pressure of the material in the feed shaft as well as from the frictional forces on the walls. The material flow rate prevailing in the feed shaft and the quantity supplied to the moulding gap results therefrom.

In accordance with an expedient embodiment, the sidewall member is adapted to be moved into the feed shaft with a translatory movement. The translatory movement into the feed shaft can be brought about in a simple and inexpensive manner e.g. by means of an elongated-hole or cam guide mechanism. This movement can be carried out into and out of the feed shaft during the pressing operation.

The sidewall member is preferably adapted to be moved such that it is displaced towards the moulding gap and narrows the width of the cross-section of the feed shaft. This direction of movement is particularly energy-saving because it corresponds essentially to the flow direction of the material. This has the effect that only minor actuating forces have to applied when the cross-section of the feed shaft is narrowed. Moreover, the sidewall member moves towards the moulding gap when the feed shaft is being narrowed so that the material is guided by said sidewall up to and into the area of the moulding gap. Losses of material caused by material escaping between the sidewall member and the rolls are thus avoided to a very large extent and a high briquette density is achieved. When the cross-section is being narrowed, the sidewall member can be moved essentially parallel to the direction of rotation of the moulding roll. The sidewall member follows essentially the flow of material in the area of the roll, and this will render the actuating forces very small.

It is imaginable that the sidewall member is guided by a cam guide mechanism. The cam guide mechanism can technically be realized in a simple and inexpensive manner and is particularly suitable for controlling translatory movements. The sidewall member can be moved more precisely with the aid of said cam guide mechanism so that the heat-insulating material is prevented from being rubbed off at other adjacent stationary walls due to an unprecise execution of the movement.

Preferably, two sidewall members are arranged on opposite sides of the feed shaft. The displacement path of each sidewall member is thus reduced. The cross-section is defined between the two sidewall members as the result of each individual displacement. By inserting and removing the sidewall members into and out of the cross-section to non-identical degrees, said cross-section can be formed asymmetrically and such that it is displaced relative to the moulding gap. This has the effect that the material will be supplied to the moulding gap asymmetrically. One of the moulding rolls can be used as supply means acting on one side in the area of the moulding gap. This will increase the quality as well as the density of the briquettes. The briquette density can be varied due to the selectable arrangement of the cross-section distributed over the whole cross-section of the feed shaft. Moreover, the fact that the cross-section 1s asymmetrical relative to the moulding gap prevents the flow of material from slipping through unhindered in the central area of the cross-section of the feed shaft.

In accordance with an expedient embodiment, the two sidewall members can be adapted to be moved symmetrically. This will optimize the displacement path of the two sidewall members. The two sidewall members can be moved via two different drive means so that each drive means only has to carry out half of the displacement work.

The present invention additionally takes as a basis a flowrate control method for gravity feeders of roller presses, wherein bulk material or flowable material is supplied by at least one regulating means through a feed shaft to a moulding gap formed between at least two rolls and is processed by said rolls, at least one of said rolls being driven.

For obtaining briquettes of high density and high quality, this method is improved in such a way that the material is supplied to the moulding gap by the regulating means in response to the torque prevailing at least one driven roll.

It is thus guaranteed that a sufficient amount of material can always be supplied through the feed shaft to the moulding gap by the regulating means. The filling level in the moulding gap can be controlled precisely so that, if precompacting of the material is necessary, a sufficiently high column of material will always be available, which applies a sufficiently high hydrostatic pressure to the material located close to the moulding gap.

If a column of material is undesirable, e.g. in cases in which hot briquetting material with good flow and filling properties is pressed, the filling level of the moulding gap can be controlled exactly via the torque-dependent supply of material. This is particularly applicable in connection with mixtures of materials comprising lump material and fine material where the fine material gives off gas during the precompacting process between the rolls and where the feed shaft is required as a space into which said gas can escape.

Surprisingly enough, this method is particularly advantageous for the purpose of pressing hot material having temperatures of up to 1000° C. This is realizable for lump material, fine-grain material or mixtures of these two materials. The supply of material can be adapted to the respective advantageous process conditions.

Preferably, the material is supplied by the regulating means in response to the extent to which the torque prevailing at least one roll deviates from a desired value. The desired torque value can in each case be adjusted in dependence on the optimum pressing conditions. If the torque deviates from the desired value, the amount of material supplied will be changed by adjusting the regulating means until the roll torque has returned to a tolerable range. The briquette quality can thus be adjusted simply by adjusting the regulating means so that the control of the briquette quality by changing the power of the elements driving the rolls can selectively be dispensed with.

In accordance with a particularly advantageous embodiment, the material is supplied in response to the filling level in the feed shaft. An additional criterion can thus act on the adjustment of the regulating means. A required or an undesired column of material in the feed shaft can separately be determined via this dependence. This dependence can especially be used for controlling the hydrostatic pressure required for precompacting the material.

The material is supplied in an advantageous manner in response to the roll pressure acting on at least one roll. The roll pressure as a measure of the amount of material pressed in the moulding gap and the hydrostatic pressure acting above the moulding gap is an additional criterion for a desired briquette density or quality. The individual parameters which are advantageous for the respective pressing process are adjusted and controlled by means of the influence of this criterion on the supply of material, e.g. on the adjustment of the regulating means.

It is suggested that the material should be supplied in response to the displacement path of at least one displaceably supported roll. The displacement path of a displaceably supported roll is a measure of the amount of material which is just being pressed in the moulding gap as well as of the column of material which is contained in the feed shaft and which applies pressure to the gap between the rolls. The quality of the briquettes can be controlled in a particularly effective manner via this additional criterion for the supply of material.

It is imaginable that at least one of the indicators roll torque, filling level, roll pressure or displacement path constitutes at least one limit value for the supply of material. Process conditions which are undesirable for high quality briquettes can be excluded by means of these limit values. The dependence of the regulating means on the torque can thus be kept within specific limits. It is thus possible to adjust very finely differentiated process conditions which are adapted to various demands.

In accordance with a preferred embodiment, a regulating tongue is adjusted as a regulating means in the area of the feed shaft. The effective open cross-section of the feed shaft can be influenced via the regulating tongue and the moulding gap has supplied thereto dosed amounts of material. Via the regulating tongue acting as a throttle, the feed shaft can be used as a storage hopper releasing the desired amount of material through an outlet determined by the control. It is thus possible to realize the supply of material, e.g. in response to the roll torque, by means of a component which is easy to adjust.

In accordance with one variant of the present invention, the amount of material supplied by a horizontal conveyor, which serves as a regulating means, is adjusted. The horizontal conveyor is particularly suitable for being used as a regulating means and the flow of material conveyed thereby can easily be adjusted by varying the conveying speed. The horizontal conveyor is particularly suitable for being used as a continuously operating regulating means supplying e.g. material which originates from a preceding process directly to the feed shaft of the roller press.

In accordance with one possible embodiment, the sidewalls of the feed shaft are used as a regulating means and adjusted such that the cross-section of the feed shaft is changed. This is particularly advantageous for lump material which would obstruct an insufficiently large cross-section of an outlet to the moulding gap. Via the sidewall adjustment resulting in a variation of the cross-section, the hydrostatic pressure produced by a column of material in the feed shaft and acting on the moulding gap will be varied so that the filling of the moulds and the precompacting of the material will be changed. This will also have an effect on the torque of the rolls, which can be caused to return to a tolerable range in this way. The consequence is that briquettes of a desired quality will be produced.

Embodiments of the present invention are shown in the drawing and will be explained hereinbelow.

DETAILED DESCRIPTION

Figure 1:
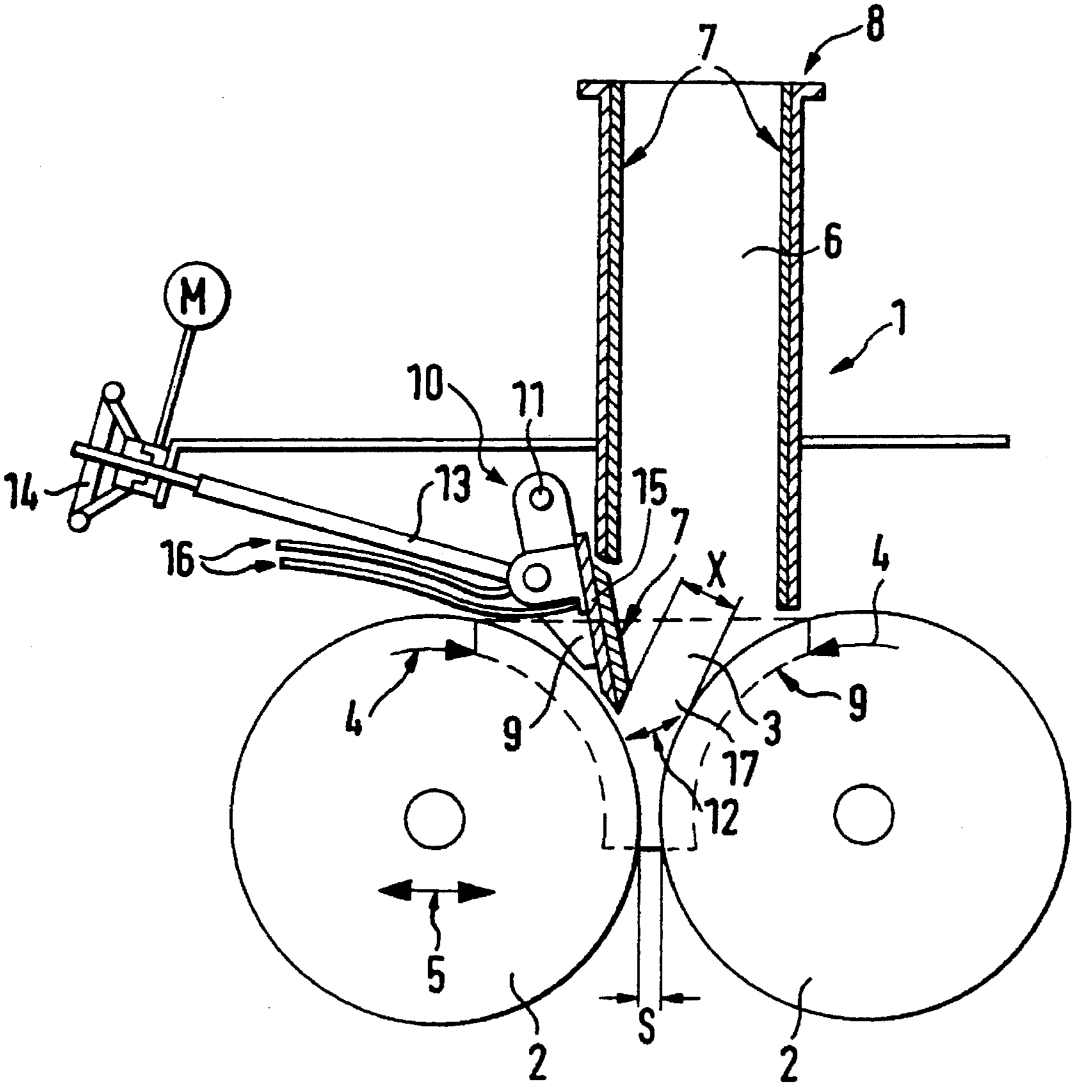
FIG. 1 shows a vertical section through an apparatus according to the present invention provided with a pivotable regulating tongue.

FIG. 1 shows an apparatus 1 according to the present invention with two rolls 2, which are arranged parallel to each other and which rotate towards each other. The rolls 2 are arranged in spaced relationship with each other and delimit between them a moulding gap 3 widening into a funnel-shape in a direction opposite to the direction of rotation 4 of the rolls 2. At the narrowest point between the two rolls 2, the moulding gap 3 has the width S. The arrow 5 shows the horizontally possible direction of displacement of one of the rolls 2.

Above the rolls 2, a feed shaft 6 is arranged. The feed shaft 6 has a rectangular cross-section, one side of the rectangle being arranged parallel to the direction in which the moulding gap 3 extends. The feed shaft 6 is arranged such that it is displaced relative to the moulding gap 3. The inner side of the feed shaft 6 is provided with a heat-insulating layer 7, which consists of a refractory. The upper end of the feed shaft is provided with a connection piece 8 which is adapted to have attached thereto e.g. a charging device.

At the lower end, the feed shaft 6 has a feed hopper 9 constituting an extension of the respective sidewall extending perpendicularly to the rolls 2. The feed hopper 9, which is shown by a broken line, extends into the moulding gap 3 and is essentially adapted to the circular form of the circumferential surfaces of the rolls 2. Also the feed hopper 9 is provided with a heat-insulating layer 7 on the inner side of the feed shaft 6.

In the area of the lower end of the feed shaft 6, a regulating tongue 10 is arranged. The regulating tongue 10 is supported such that it is adapted to be rotated about a shaft 11 and it is capable of carrying out a pivotal movement 12.

The regulating tongue 10 is provided with a connecting rod 13 acting thereon at a point which is displaced from the shaft 11, said connecting rod 13 being driven by a motor M. The connecting rod 13 is connected to a handwheel 14 through which the regulating tongue 10 can be adjusted.

The regulating tongue 10 is provided with a plate 15 connected via lines 16 to a cooling system. On the side facing the feed shaft, the plate 15 is provided with a heat-insulating layer 7. The lower end of the plate 15, which extends into the moulding gap 3, defines together with the opposite roll 2 a passage 17 having the size X.

Figure 2:
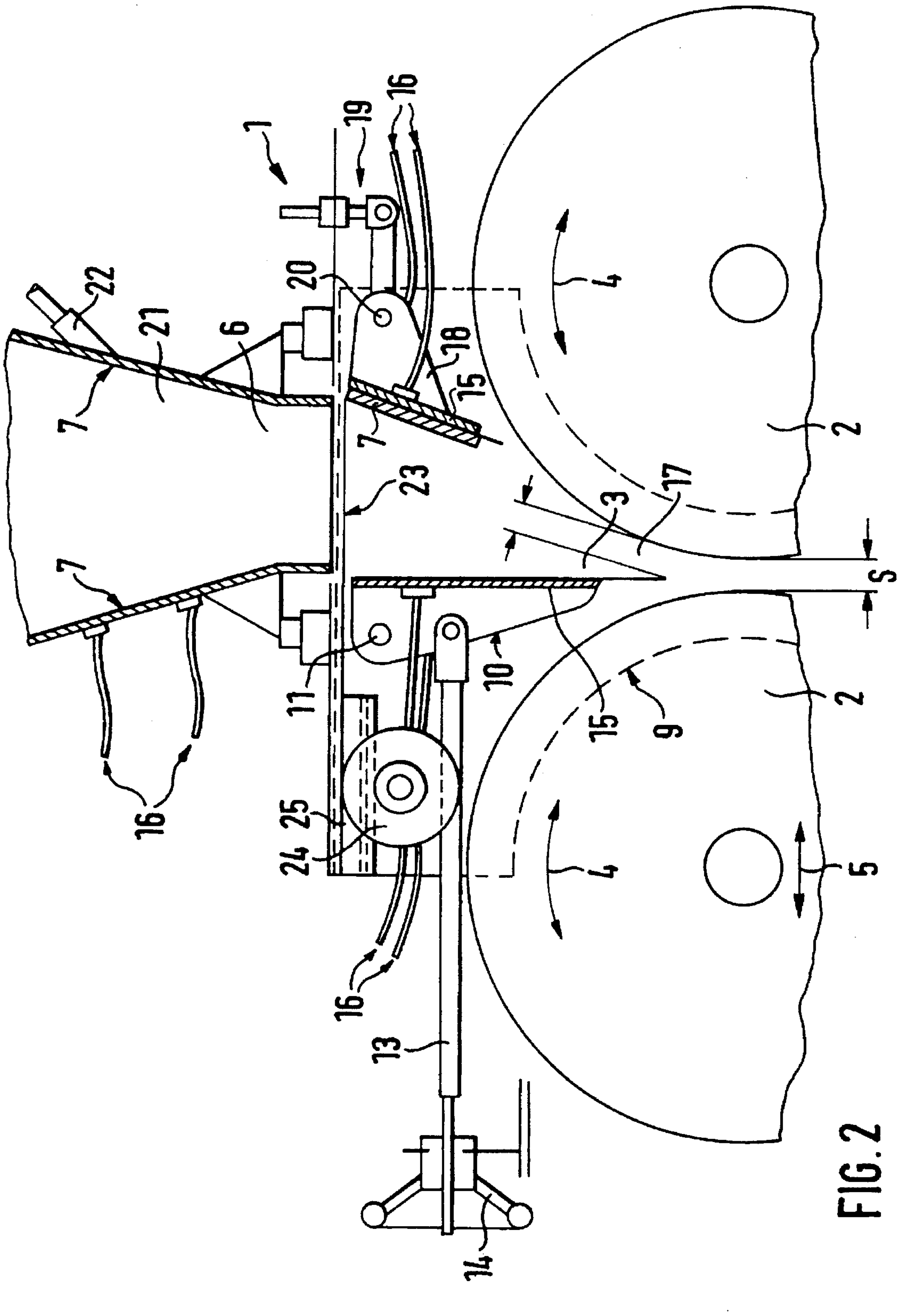
FIG. 2 shows a vertical section through an apparatus according to the present invention provided with two pivotable regulating tongues and a closure element which is adapted to be inserted.

The apparatus according to the present invention disclosed in FIG. 2 shows, as a further development of the apparatus according to FIG. 1, a second regulating tongue 18, which is arranged opposite to the regulating tongue 10 and which is adapted to be rotated about the shaft 20 via a lever system 19. Analogously to the regulating tongue 10, the second regulating tongue 18 is provided with a plate 15 having a heat-insulating layer 7, which consists of a refractory, on the side facing the inner side of the feed shaft 6. Also the plate 15 of the second regulating tongue 18 is connected to a cooling system via lines 16.

The feed shaft 6 widens upwards into a funnel-shape thus defining a storage hopper 21. Lines 16 connect the storage hopper to a cooling system. A connection piece 22 in the upper area of the storage hopper 21 supplies inert gas to said storage hopper 21.

The feed shaft 6 is adapted to be closed by means of a closure element 23 at the lower end thereof. With the aid of a gear 24 and a rack 25, the closure element 23 is adapted to be moved to a position below the feed shaft and to be retracted from the cross-sectional opening of said feed shaft 6.

Figure 3:
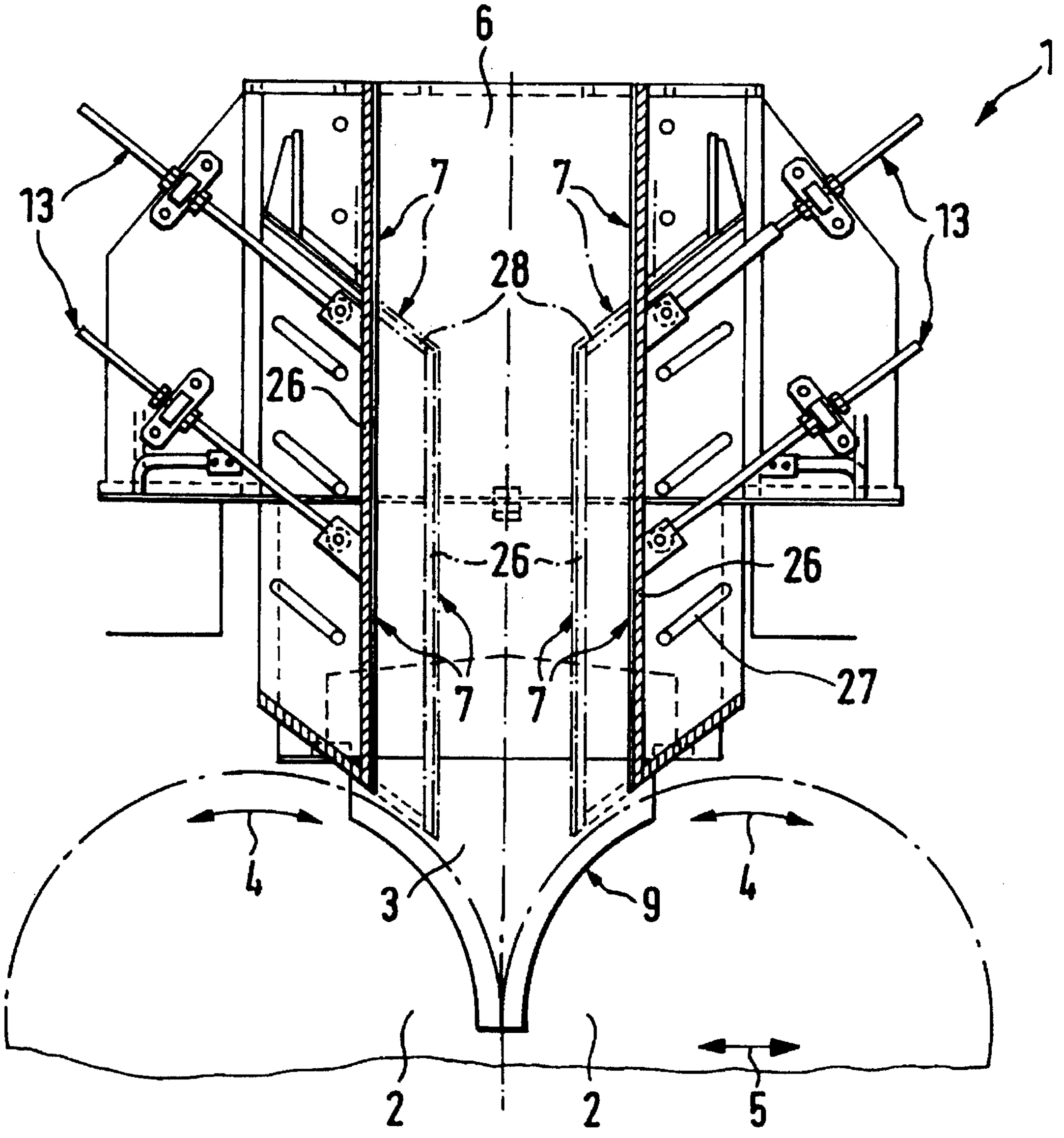
FIG. 3 shows a vertical section through an apparatus according to the present invention provided with two sidewalls which are adapted to be inserted.

In FIG. 3, the feed shaft 6 is arranged symmetrically above the moulding gap 3. The feed shaft 6 is provided with two displaceable sidewall members 26, which are arranged opposite each other and which are adapted to be displaced along a cam guide mechanism 27 in a movement which is directed at an oblique angle towards the moulding gap 3. The outer surfaces of the side wall members 26 are acted upon by connecting rods 13 through which said sidewall members 26 can be moved. The broken lines show the sidewall members 26 in a partially extended position.

The inner side of the feed shaft 6 as well as the inner sides of the sidewall members 26 are provided with a heat-insulating layer 7. Analogously, the end faces 28 of the side wall members 26 are provided with a heat-insulating layer 7.

Figure 4:
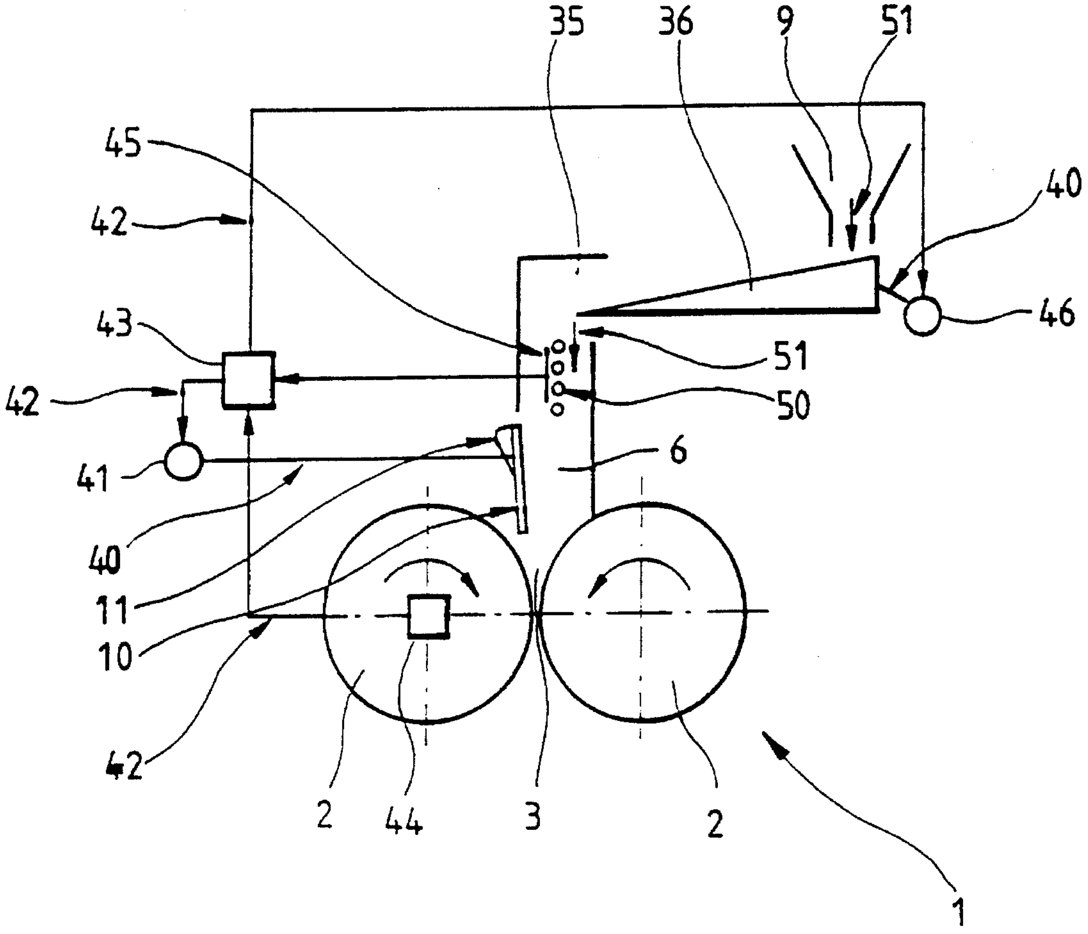
FIG. 4 shows a schematic sketch of an apparatus according to the present invention provided with a regulating tongue.
Figure 5:
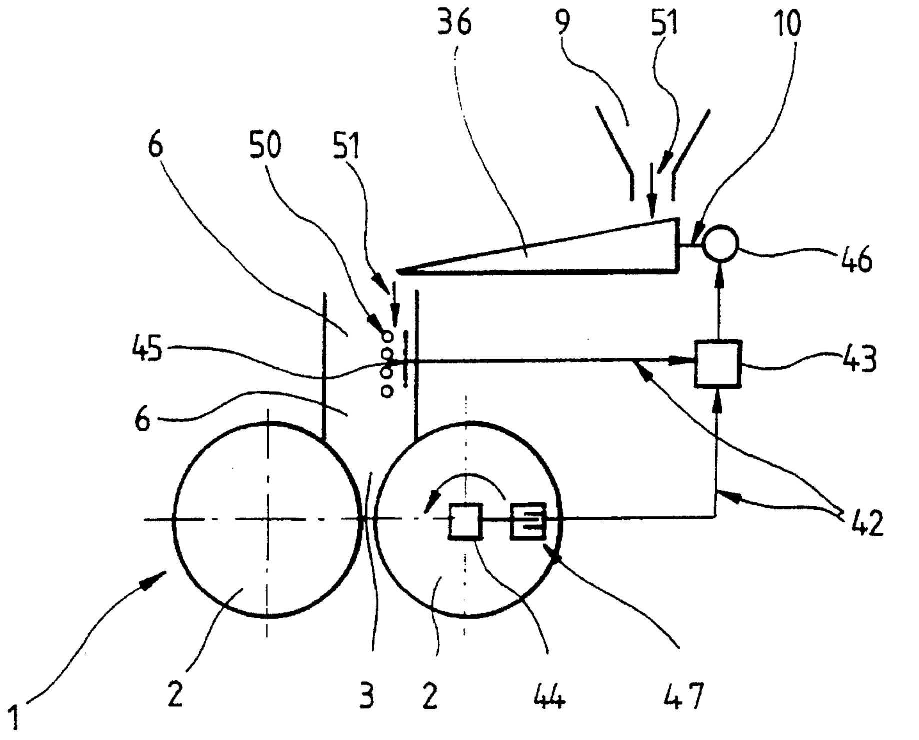
FIG. 5 shows a schematic sketch of an apparatus according to the present invention provided with a displacement path detector.
Figure 6:
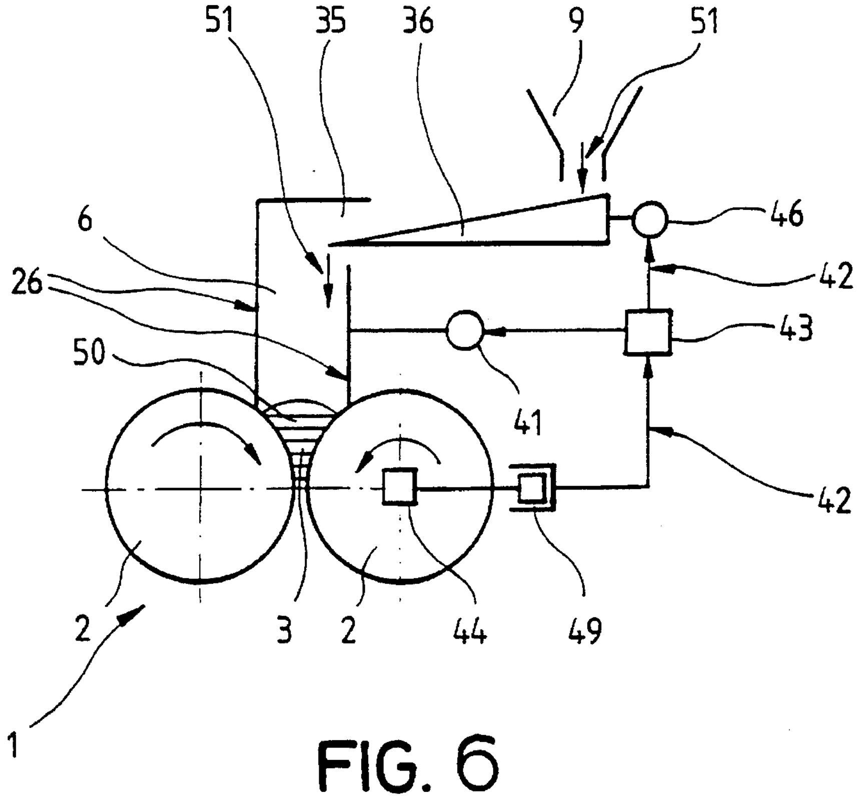
FIG. 6 shows a schematic sketch of an apparatus according to the present invention provided with displaceable sidewalls of the feed shaft.

FIG. 4 to 6 are simplified schematic sketches of apparatuses according to the present invention in which the heat-reducing means 7, 16 of the regulating means 10, 18, 26 and of the feed shaft 6, 9, 26, 28 are not shown for the sake of clarity.

FIG. 4 shows an apparatus 1 with two rolls 2 which are arranged parallel to each other, said rolls 2 rotating in opposite directions of rotation and defining between them a moulding gap 3. The feed shaft 6 is directed towards the moulding gap 3 in the direction of transport of the rolls 2. At the upper end, the feed shaft 6 is provided with a filling shaft 35 into which the end of a conveying path 36 terminates. At the opposite end of the conveying path 36, a feed hopper 9 is located whose narrowed end faces the conveying path 36.

At the end facing the moulding gap 3, the feed shaft 6 is provided with a rotatably supported regulating tongue 10. The regulating tongue 10 is adapted to be pivotably moved about a rotary shaft 11 into and out of the feed shaft 6 across the area thereof. Via a connection 40, the regulating tongue 10 is connected to an actuator 41, e.g. a motor. The actuator 41 is connected to a central unit 43 via a control line 42.

One of the two rolls 2 has a torque detector 44, which is connected to the central unit 43 via a control line 42. The feed shaft 6 is provided with a filling level detector 45, which is, again via a control line 42, connected to the central unit 43. The central unit 43 is connected to a motor operator 46 via a control line 42, said motor operator 46 being connected to the conveying path 36 via a connection 40.

In the feed shaft 6, material 50 is supplied to the moulding gap 3 in the direction of transport 51.

In FIG. 5, one of the two rolls 2 is supported such that it is adapted to be displaced perpendicularly to the moulding gap 3 and is provided with a displacement path detector 47, the apparatus 1, the feed shaft 6, the conveying path 36, the feed hopper 9, the filling level detector 45, the torque detector 44, the motor operator 46 and the central unit 43 being arranged in essentially the same way as before. The displacement path detector 47 detects the displacement path of the roll 2 and is connected via a control line 42 to the central unit 43.

In the embodiment according to FIG. 6, the moulding gap 3 is filled with material 50 and the feed shaft 6 is provided with laterally displaceable sidewall members 26. The sidewall members 26 are connected to an actuator 41, which is connected to the central unit 43 via a control line 42. One of the two rolls 2 is provided with a roll pressure detector 49 in addition to the torque detector 44, said roll pressure detector 49 being connected to the central unit 43 via a control line 42.

In the following, the mode of operation of the embodiments of an apparatus according to the present invention, which are shown in the drawing, will be explained in detail.

The storage hopper 21 contains e.g. hot-reduced iron sponge; preferably in the form of pellets, lump ore and fine ore, which is to be converted into iron sponge briquettes. The material has a temperature of up to 1000° C. and slides slowly downwards in the feed shaft due to the force of gravity. In order to protect the storage hopper 21 and the feed shaft 6 against damage which may be caused by excessive temperatures, these components are protected against excessive temperatures by a heat-insulating layer 7 consisting of a refractory. In addition, they are provided with cooling means which are connected to a cooling system via the lines 16. The heat supplied is in this way dissipated depending on the efficiency of the cooling system connected.

In accordance with the embodiments shown in FIG. 1 and 2, respectively, the regulating tongue 10 is moved to the desired open position via the connecting rod 13 and the motor M connected thereto or the handwheel 14. Analogously, the second regulating tongue 18 is moved via the lever system 19 into the desired position. The heat-insulating layer 7 consisting of a refractory protects the plate 15 and the respective regulating tongues 10, 18 against damage caused by an excessive supply of heat. In addition, heat is dissipated by the lines 16 connected to a cooling system. The regulating tongues 10, 18 have provided thereon adequate cooling means for absorbing the heat.

In order to obtain the best possible mode of operation, the regulating tongue 10 extending into the moulding gap is adjusted such that a distance X, which is twice to three times as large as the width S of the moulding gap, is defined between the regulating tongue 10 and the roll 2 located opposite thereto. The reduction of the cross-section between the moulding roll and the regulating tongue 10 guarantees that the material, which flows faster in the central area of the cross-section of the moulding gap 3, does not enter said moulding gap 3 in increased quantities and unintentionally, whereby a pulsating obstruction of the moulding gap 3 would be caused. The roll 2, above which the feed shaft 6 is essentially arranged, conveys the material towards the moulding gap 3 in the direction of rotation 4, and, due to this conveying force, it causes the material to be precompacted prior to the final compacting between the two rolls 2.

The rolls 2 each carry on their circumferential surface one half of a briquette mould (e.g. in the form of moulding segments or rings on the surface of the roll) and they rotate in opposite directions so that the material will be pressed into the final briquette shape at the narrowest point of the moulding gap 3. Depending on the quantity of material supplied and on the briquette density desired, at least one of the rolls 2 is supported such that it is horizontally displaceable, said roll being then horizontally adjusted in an adequate manner.

Below the feed shaft 6, the feed hoppers 9 supply the material to the moulding gap 3 from the side and guarantee that the material is pressed into the tapering moulding gap 3 essentially without any loss of material or loss of pressure.

For interrupting the supply of material, the closure element 23 is inserted into the feed shaft 6 so that the cross-section of the feed shaft will be closed completely. Residual material contained in the feed shaft 6 and in the storage hopper 21, respectively, will thus be held back and the moulding gap 3 can be emptied completely by continuing the rotary movement of the rolls 2. By retracting the closure element 23, material is again supplied to the roller press and the pressing process begins.

Revert material (recycle) can be supplied to the feed shaft 6 and the storage hopper 21, respectively, via one or several ones of the connection pieces 22. In addition, inert gas is supplied via a connection piece 22 for rendering the storage hopper 21 inert before the machine starts. A third connection piece 22 is provided for sucking off the gas which escapes from the fine iron sponge.

In the embodiment shown in FIG. 3, the sidewall members 26 are adapted to be moved into the feed shaft 6 at an oblique angle so that the cross-section of the feed shaft 6 will be reduced in the area of the sidewall members 26 and enlarged when said sidewall members 26 are retracted. This variation of cross-section is used for controlling the flow of material to the roller press. The material in the feed shaft is acted upon by its own weight as well as by the hydrostatic pressure applied by material which is located on top of said first-mentioned material. Within the feed shaft 6, or rather between the sidewall members 26, these forces are counteracted by the frictional force on the walls. When the cross-sectional area of the feed shaft 6 is reduced by inserting the sidewall members 26, the hydrostatic pressure acting on the material will decrease so that the flow of material will diminish. Analogously, the hydrostatic pressure will increase when the cross-section of the feed shaft 6 between the sidewall members 26 is enlarged so that the flow of material will increase. In addition to a change in the hydrostatic pressure caused by variations of the cross-section of the feed shaft 6, the hydrostatic pressure can also be influenced by controlling the filling level in the feed shaft 6 and in the storage hopper 21, respectively. It is, for example, possible to change the filling level in the feed shaft 6 and in the storage hopper 21, respectively, by means of a continuously conveying horizontal conveyor operating at a variable conveying speed so that the flow of material to the roller press will be controlled through said filling level.

Hence, the preforming force and the precompacting of the material can be adjusted via the hydrostatic pressure before the material enters the roller press. Depending on the degree of precompacting and the flow of material, briquettes of different density and quality can be produced. The density of the briquettes and their quality can, of course, also be influenced by different speeds of the rolls.

Another factor which is advantageous with respect to the application of pressure is an increase in the size of the roll diameter. Instead of the normal diameter of 1000 mm used in connection with screw feeders, it is now, for example, possible to use 1400 mm in connection with gravity feeders. The diameter of 1400 mm proved to be particularly advantageous for achieving a high briquette density and quality. Rolls with a larger diameter have a longer closing travel until they reach the narrowest point of the moulding gap 3 and, at the same rotational speed of the rolls, a longer closing time than rolls having a smaller diameter. This is particularly advantageous with respect to the degasification of the pores with the aid of which a better quality of the briquettes can be achieved. Briquettes produced with longer closing times have smaller pores, they look better and the briquette quality is better.

Also the use of shallower briquetting moulds is advantageous with respect to a good quality of the briquettes. The use of such shallower moulds results in a longer closing time of the briquetting mould, which is formed by combining two semimoulds between the two rolls until the final briquetting mould is obtained at the narrowest point of the moulding gap 3. The finer the briquetting material used is, the lower are the circumferential speeds of the rolls 2 which will suffice to obtain an equally high quality of the briquettes.

In the embodiments according to FIG. 4 to 6, material is supplied to the feed shaft 6 via the feed hopper 9 and the conveying path 36. The feed shaft 6 supplies the material to the moulding gap 3 in which the material is pressed between the rolls 2. The torque prevailing at at least one roll 2 is measured via the torque detector 44 and supplied to the central unit 43 in the form of a signal. The central unit 43 processes this signal and transmits a signal to the actuators 41 or the motor operators 46 in accordance with a control rule. These actuators or motor operators vary, in accordance with the signal received from the central unit 43, the regulating means to which they are connected. Depending on the respective embodiment, it is thus possible to change the adjustment of the conveying path 36, of the regulating tongue 10 or the displaceable sidewall members 26.

The regulating tongue 10 opens and closes the opening of the feed shaft 6 close to the moulding gap and supplies thus the necessary amount of material to the moulding gap 3. The conveying path 36 can, for example, be constructed as a horizontal conveyor whose speed is adapted to be varied e.g. via the motor operator 46 so that the flow of material supplied to the feed shaft 6 can be varied.

The central unit 43 receives the signal of the torque detector 44 and compares this signal with a predetermined desired value. Depending on the deviation of the desired value, the central unit 43 supplies a signal to the actuators 41 or the motor operator 46 and changes thus the amount of material 50 supplied. The change in the amount of material supplied will also cause a change in the torque measured at the roll 2, said torque being again supplied via the torque detector 44 to the central unit 43 in the form of a signal. This process takes place again and again until the torque measured corresponds to a tolerable range around the desired value.

The filling level, the roll pressure and the displacement path are transmitted in the form of signals to the central unit 43 via the filling level detector 45, the displacement path detector 47 and the roll pressure detector 49. Also these signals are compared with respective desired values and, together with the torque control, they are incorporated into the signal transmitted to the actuators 41 or motor operators 46. The filling level, the displacement path and the roll pressure are preferably used as limit value indicators by the central unit 43. When a limit value has been exceeded, the respective desired regulating means are varied.

I claim:

1. An apparatus for hot-briquetting iron sponge, comprising a gravity feeder which comprises a feed shaft and regulating means for supplying material in a dosed quantity to a moulding gap of a roller press, wherein the regulating means (10, 18, 26) are provided with heat-reducing means (7, 16).

2. An apparatus according to claim 1, wherein the regulating means (10, 18, 26) are provided with a cooling system (16).

3. An apparatus according to claim 1, wherein the regulating means (10, 18, 26) are water-cooled.

4. An apparatus according to claim 1, wherein the regulating means (10, 18, 26) are lined with a refractory.

5. An apparatus according to claim 1, wherein the feed shaft (6, 9, 26, 28) is provided with heat-reducing means (7, 16).

6. An apparatus according to claim 5, wherein an inner side of the feed shaft (6, 9, 26, 28) is lined with a refractory.

7. An apparatus according to claim 5, wherein the feed shaft (6, 9, 26, 28) is provided with a cooling system (16).

8. An apparatus according to claim 5, wherein the feed shaft (6, 9, 26, 28) is water-cooled.

9. An apparatus according to claim 1 wherein the moulding gap (3), is formed between at least two rolls (2), at least one of said rolls being a driven roll and further comprising a torque detector (44) for said driven roll, said detector being connected to an actuator (41, 46) of the regulating means (10, 18, 26, 36) via a central processing unit (43).

10. An apparatus according to claim 9, wherein the feed shaft (6) is provided with a filling level detector (45) which is connected to the central processing unit (43).

11. An apparatus according to claim 9, wherein at least one of the rolls (2) is connected to a roll pressure detector (49) which is connected to the central processing unit (43).

12. An apparatus according to claim 9, wherein at least one of said rolls (2) is supported such that it is laterally displaceable relative to its axis of rotation.

13. An apparatus according to claim 12, wherein the displaceably supported roll (2) is provided with a displacement path detector (47) connected to the central processing unit (43).

14. An apparatus according to claim 1, wherein the regulating means is provided with a horizontal conveyor (36) directed towards the feed shaft (6).

15. An apparatus according to claim 1, wherein the feed shaft (6) is arranged asymmetrically with respect to the moulding gap (3).

16. An apparatus according to claim 1, wherein the regulating means (10, 18, 26) completely closes the feed shaft (6) when the regulating means are in a closed position.

17. An apparatus according to claim 1, wherein the regulating means (10, 18, 26) completely uncovers the feed shaft (6) when the regulating means are in an open position.

18. An apparatus according to claim 1, wherein said roller press includes a pair of rolls and the regulating means (10,

18, 26) are arranged in an area of an end of the feed shaft (6) which faces the rolls (2).

19. An apparatus according to claim 1, wherein the regulating means (10, 18, 26) are directed towards the moulding gap (3) in a funnellike manner when they are in the open position.

20. An apparatus according to claim 1, further comprising a motor operator (M) in driving connection to the regulating means (10, 18, 26).

21. An apparatus according to claim 1, wherein the feed shaft (6) is provided with lateral feed hoppers (9) extending into the moulding gap (3).

22. An apparatus according to claim 21, wherein said roller press includes a pair of rolls and the feed hoppers (9) are essentially adapted to the circular form of the circumferential surfaces of the rolls.

23. An apparatus according to claim 1, wherein the feed shaft (6) is constructed as a storage hopper (21).

24. An apparatus according to claim 1, wherein the feed shaft (6) is provided with connection pieces (22) in the upper area thereof.

25. An apparatus according to claim 1, further including a closure element movable relative to said feed shaft and wherein the feed shaft (6) is adapted to be closed completely by the closure element (23) the feed shaft.

26. An apparatus according to claim 25, wherein the closure element (23) comprises a slide adapted to be moved into the feed shaft (6) with a translatory movement.

27. An apparatus according to claim 1, wherein the regulating means (10, 18) comprises at least one regulating tongue (10).

28. An apparatus according to claim 27, further comprising a shaft (11) rotatively connected to the regulating tongue (10).

29. An apparatus according to claim 27, wherein said roller press includes a pair of rolls and, at least in an open condition, the regulating tongue (10) extends at least partially into the moulding gap (3).

30. An apparatus according to claim 29, wherein a maximum distance X which can be adjusted between the end of the regulating tongue (10) extending into the moulding gap (3) and the opposite roll (2) is approximately twice to three times as large as a smallest width S of the moulding gap (3).

31. An apparatus according to claim 1, wherein the regulating means (26) are constructed as at least one sidewall member (26) of the feed shaft (6), said sidewall member being adapted to carry out a relative movement.

32. An apparatus according to claim 31, wherein the sidewall member (26) is adapted to be moved into the feed shaft (6) with a translatory movement.

33. An apparatus according to claim 31, wherein the sidewall member (26) is adapted to be moved such that it is displaced towards the moulding gap (3) and narrows the width of the cross-section of the feed shaft.

34. An apparatus according to claim 31, wherein the sidewall member (26) is guided by a cam guide mechanism.

35. An apparatus according to claim 31, characterized in that two sidewall members (26) are arranged on opposite sides of the feed shaft (6).

36. An apparatus according to claim 35, wherein the two sidewall members (26) are adapted to be moved symmetrically.

* * * * *